US011958041B2

(12) United States Patent
Sheehan et al.

(10) Patent No.: US 11,958,041 B2
(45) Date of Patent: Apr. 16, 2024

(54) METHODS AND CATALYSTS FOR CARBON DIOXIDE CONVERSION TO LONG-CHAIN HYDROCARBONS

(71) Applicant: Air Company Holdings, Inc., Brooklyn, NY (US)

(72) Inventors: Stafford W. Sheehan, Tiverton, RI (US); Chi Chen, Shrewsbury, MA (US); Mahlet Garedew-Ballard, Franklin Park, NJ (US); Neva Luthria, New York, NY (US); Mihir R. Shah, Plainsboro Township, NJ (US); Qiyuan Wu, Jersey City, NJ (US)

(73) Assignee: Air Company Holdings, Inc., Brooklyn, NY (US)

( * ) Notice: Subject to any disclaimer, the term of this patent is extended or adjusted under 35 U.S.C. 154(b) by 0 days.

(21) Appl. No.: 18/366,901

(22) Filed: Aug. 8, 2023

(65) Prior Publication Data

US 2023/0390744 A1 Dec. 7, 2023

Related U.S. Application Data

(63) Continuation of application No. PCT/US2023/010444, filed on Jan. 10, 2023.
(Continued)

(51) Int. Cl.
*B01J 23/80* (2006.01)
*B01J 21/04* (2006.01)
(Continued)

(52) U.S. Cl.
CPC .............. *B01J 23/80* (2013.01); *B01J 21/04* (2013.01); *B01J 23/72* (2013.01); *B01J 23/745* (2013.01);
(Continued)

(58) Field of Classification Search
CPC .............. C10G 2/50; C10G 2300/4081; C10G 2300/70; B01J 23/80; B01J 23/72;
(Continued)

(56) References Cited

U.S. PATENT DOCUMENTS 719,623 A 2/1903 Spohn
1,873,536 A 8/1932 Brown et al.
(Continued)

FOREIGN PATENT DOCUMENTS

CA 2496839 A1 1/2006
CN 114939433 A 8/2022
(Continued)

OTHER PUBLICATIONS

International Search Report and Written Opinion for International Application No. PCT/US23/10444 dated Apr. 13, 2023.
(Continued)

*Primary Examiner* — Youngsul Jeong
(74) *Attorney, Agent, or Firm* — Foley Hoag LLP; Lucas P. Watkins; Benjamin A. Vaughan (57) ABSTRACT

The present disclosure provides catalysts, reactor systems, and methods for the conversion of carbon dioxide and hydrogen gas into paraffins, olefins, and other hydrocarbon products. Methods for utilization of mixtures of carbon dioxide, carbon monoxide, and hydrogen gas in a manner distinct from legacy Fischer-Tropsch reactors to produce hydrocarbons is also included.

20 Claims, 3 Drawing Sheets

Related U.S. Application Data (60) Provisional application No. 63/409,085, filed on Sep. 22, 2022, provisional application No. 63/298,402, filed on Jan. 11, 2022.

(51) Int. Cl.

| | | |
|---|---|---|
| *B01J 23/72* | (2006.01) | |
| *B01J 23/74* | (2006.01) | |
| *B01J 23/745* | (2006.01) | |
| *B01J 23/75* | (2006.01) | |
| *B01J 37/00* | (2006.01) | |
| *B01J 37/02* | (2006.01) | |
| *B01J 37/03* | (2006.01) | |
| *B01J 37/08* | (2006.01) | |
| *C10G 2/00* | (2006.01) | |

(52) U.S. Cl.
CPC .......... *B01J 23/75* (2013.01); *B01J 37/0036* (2013.01); *B01J 37/0213* (2013.01); *B01J 37/031* (2013.01); *B01J 37/08* (2013.01); *C10G 2/50* (2013.01); *C10G 2300/4081* (2013.01); *C10G 2300/70* (2013.01)

(58) Field of Classification Search
CPC . B01J 23/75; B01J 21/04; B01J 23/745; B01J 37/031; B01J 37/0213; B01J 37/0036; B01J 37/08

See application file for complete search history.

(56) References Cited

U.S. PATENT DOCUMENTS

| | | | |
|---|---|---|---|
| 3,452,106 | A | 6/1969 | Sato et al. |
| 4,482,767 | A | 11/1984 | Imai |
| 4,499,327 | A | 2/1985 | Kaiser |
| 5,126,308 | A | 6/1992 | Barger et al. |
| 5,714,662 | A | 2/1998 | Vora et al. |
| 8,436,215 | B2 | 5/2013 | Chornet et al. |
| 8,779,215 | B2 | 7/2014 | Kharas |
| 10,464,859 | B2 | 11/2019 | Ge et al. |
| 10,472,573 | B2 | 11/2019 | Ge et al. |
| 2003/0220531 | A1 | 11/2003 | Cortright et al. |
| 2005/0107481 | A1 | 5/2005 | Janssen et al. |
| 2011/0105630 | A1 | 5/2011 | Dorner et al. |
| 2012/0209037 | A1 | 8/2012 | Viljoen et al. |
| 2013/0030224 | A1 | 1/2013 | Kim et al. |
| 2014/0051897 | A1 | 2/2014 | Peters et al. |
| 2015/0175505 | A1* | 6/2015 | Glover ............... C07C 7/04 585/738 |
| 2015/0247100 | A1 | 9/2015 | Bradin |
| 2016/0038919 | A1 | 2/2016 | Landau et al. |
| 2018/0362426 | A1 | 12/2018 | Chen et al. |
| 2019/0071374 | A1 | 3/2019 | Ge et al. |
| 2019/0194559 | A1 | 6/2019 | Mdleleni et al. |
| 2021/0147326 | A1 | 5/2021 | Sheehan |
| 2022/0184586 | A1 | 6/2022 | Yao et al. |
| 2023/0060945 | A1 | 3/2023 | Sheehan |
| 2023/0069964 | A1* | 3/2023 | Littlewood ............ C10G 2/50 |
| 2023/0348347 | A1 | 11/2023 | Sheehan et al. |

FOREIGN PATENT DOCUMENTS

| | | |
|---|---|---|
| EP | 0096996 A2 | 12/1983 |
| EP | 0269297 A1 | 6/1988 |
| WO | WO-2019/010095 A1 | 1/2019 |
| WO | WO-2021/262922 A1 | 12/2021 |
| WO | WO-2022/008534 A1 | 1/2022 |
| WO | WO-2022/245944 A1 | 11/2022 |
| WO | WO-2023/137002 A1 | 7/2023 |

OTHER PUBLICATIONS

Chen et al., "Single-Step Production of Alcohols and Paraffins from CO2 and H2 at Metric Ton Scale," ACS Energy Letters, 7: pp. 988-992 (2022).

International Search Report and Written Opinion for International Application No. PCT/US2023/033547 dated Dec. 4, 2023.

International Search Report and Written Opinion of the International Searching Authority, PCT International Patent application No. PCT/US2022/029834, dated Oct. 11, 2022, 24 pages.

Liang et al., "Direct conversion of CO2 to aromatics over K—Zn—Fe/ZSM-5 catalysts via a Fischer-Tropsch synthesis pathway." *Industrial & Engineering Chemistry Research* 61.29: 10336-10346 (2022).

International Search Report and Written Opinion for International Application No. PCT/US2023/033544 dated Jan. 2, 2024.

Zhou et al., "Direct carbon dioxide hydrogenation to produce bulk chemicals and liquid fuels via heterogeneous catalysis." Chinese Journal of Catalysis 43(8) (2022): 2045-2056.

* cited by examiner

METHODS AND CATALYSTS FOR CARBON DIOXIDE CONVERSION TO LONG-CHAIN HYDROCARBONS

This application is a Continuation of International Patent Application No. PCT/US23/10444, filed Jan. 10, 2023, which claims the benefit of priority to U.S. Provisional Patent Application No. 63/298,402, filed Jan. 11, 2022, and U.S. Provisional Patent Application No. 63/409,085, filed Sep. 22, 2022. The entire contents of each of these applications are incorporated by reference herein.

BACKGROUND OF THE INVENTION

As carbon dioxide concentrations in the atmosphere increase, it is becoming advantageous from social welfare, human health, and energy security perspectives to develop technologies that remove carbon dioxide from the air. Carbon dioxide conversion technologies have the added benefit of producing commodity chemicals on-site, anywhere on the globe, with no cost or hazard risk of transportation when coupled with air capture of $CO_2$. The need for removing $CO_2$ from the air is coupled with an increasing global utilization of renewable electricity generation methods, such as solar photovoltaics and wind turbines. Techniques like these use intermittent energy sources, such as the sun, which sets in the evening and rises in the morning, and wind, which blows intermittently. Thus, the supply of electricity from these sources to electrical grids surges at some points, and is low at others. This presents an opportunity for technologies that can intermittently utilize electricity to produce desired products on-site.

Of the available technologies to produce chemicals from carbon dioxide, hydrogenation of carbon dioxide or carbon monoxide using renewably-derived hydrogen gas from a water electrolyzer or equivalent system that produces carbon-neutral hydrogen gas, is capable of being powered completely by renewable (solar, wind, hydroelectric, etc.) electricity. A method such as this converts a carbon-based feedstock (carbon dioxide or carbon monoxide) and water into hydrocarbon chemicals using an external energy source; this is similar to the fundamental photosynthetic processes enabling life on our planet. For example, plants use photosynthesis to convert carbon dioxide, water, and solar energy into chemical energy by creating sugars and other complex hydrocarbons. This effectively stores the energy from the sun in the chemical bonds of a carbon-based compound. This process has been supporting the Earth's ecosystem and balancing carbon dioxide concentration in our atmosphere for billions of years.

In the last century, human beings have harnessed byproducts of photosynthesis, such as fossil fuels, to provide the energy required for modern life. This has released millions of tons of carbon dioxide into the Earth's atmosphere that had been previously sequestered into the fossil fuels by photosynthesis over the course of millions of years. Scientific evidence points to this rapid increase in carbon dioxide concentration in the atmosphere from anthropogenic sources to be potentially catastrophic to global climate. The development of carbon-negative processes that mimic natural ones to sequester carbon dioxide are, therefore, critical to the future of the planet, and it is an object of the present application to disclose one such invention.

SUMMARY OF THE INVENTION

In certain aspects, the present disclosure provides catalysts, comprising: copper; zinc; one or more first elements selected from iron or cobalt; oxygen; optionally, aluminum; one or more second elements selected from a Group V, VI, VII, VIII, IX, X, and XI metal (e.g., manganese, silver, niobium, zirconium, molybdenum, ruthenium, or palladium); and optionally, one or more Group IA metals, and wherein the one or more first elements is present in an amount of about 1 to about 50 wt. % (e.g., about 1 to about 10 wt. %, about 25 to about 40 wt. %, about 30 to about 40 wt. %, or about 35 to about 50 wt. %) of the total amount of the copper, zinc, the one or more first elements, the optional second element, and the optional Group IA metal.

In certain aspects, the present disclosure provides copper zinc aluminum (CZA) catalysts, comprising: copper; zinc; optionally, one or more first elements selected from cobalt, iron, or nickel; oxygen; optionally, aluminum; optionally, one or more second elements selected from a Group V, VI, VII, VIII, IX, X, and XI metal (e.g., manganese, silver, niobium, zirconium, molybdenum, ruthenium, or palladium); and optionally, one or more Group IA metals; wherein the molar ratio of copper to zinc is from about 1 to about 5.

In certain aspects, the present disclosure provides catalysts comprising: one or more metals, preferably wherein the metal is iron; optionally one or more second elements selected from copper and/or zinc; optionally one or more Group VI, VII, VIII, IX, X, or XI metal additives, (e.g., manganese, silver, niobium, zirconium, molybdenum, ruthenium, or palladium); and optionally a Group IA or IIA metal promoter.

In certain aspects, the present disclosure provides catalytic compositions, comprising the catalysts disclosed herein and an optional additional support.

In certain aspects, the present disclosure provides methods of preparing the catalysts or catalytic compositions disclosed herein, such as methods comprising preparing the catalyst by coprecipitation, wet impregnation, or ball milling, or a combination thereof.

In certain aspects, the present disclosure provides methods of reducing $CO_2$, CO, or a mixture of the two to a liquid product mixture, comprising contacting the catalysts or other catalytic compositions disclosed herein with a feed mixture comprising $CO_2$, CO, or a mixture of the two and a reductant gas at a reduction temperature and a reduction pressure, thereby providing the liquid product mixture.

In certain aspects, the present disclosure provides a catalyst comprising: one or more paraffin metal oxides; optionally a support; and optionally one or more metal additives.

DETAILED DESCRIPTION OF THE INVENTION

One of the major hurdles toward carbon dioxide sequestration is the effective utilization and catalytic transformation of carbon dioxide or carbon monoxide into useful chemicals. Plants achieve this via dehydrogenase enzymes, which utilize transition metals to catalyze the hydrogenation of carbon dioxide into carbon monoxide, formic acid, or a number of other building blocks for cellulose. Man-made systems have attempted to copy this route, and chemical methods for carbon dioxide transformation have been known for decades. Many of these, however, have energy requirements unrealistic for any large-scale deployment.

To produce chemicals from carbonaceous feedstock, the Fischer-Tropsch (FT) process is one of the most widely used petrochemical process for fuel production today. Originally reported by Fischer and Tropsch in 1922 using alkaline iron catalysts, the FT process utilizes a mixture of CO and $H_2$ at elevated temperature and pressure to produce paraffins and other hydrocarbons. Nearly all modern FT processes use commercial catalysts that are comprised of cobalt, iron, iron carbide, or ruthenium, deposited on an aluminum oxide ($Al_2O_3$) support. Thousands of variants of these catalysts have been produced, with the ultimate goal of improving the economics of the FT process. These improved economics can come about, from a catalyst development perspective, by increasing the space-time yield of the catalysts to enable smaller, more efficient reactor designs, narrowing the distribution of hydrocarbon products, or decreasing the selectivity for uneconomic byproducts.

Product distribution from the FT process is characterized by the polymerization of $CH_x$ reaction intermediates on the surface of the FT catalyst. The $CH_x$ monomers polymerize on the surface of the FT catalyst into $C_yH_z$ intermediates of different carbon numbers, which under further hydrogenation or dehydrogenation to form paraffins, olefins, and other hydrocarbon compounds. In the FT process, the C-C coupling of active $CH_x$ and $C_yH_z$ species on the surface of the FT catalyst is challenging to control, which leads to a statistical distribution of hydrocarbon products. The distribution of hydrocarbon products in FT is predicted by the Anderson-Schulz-Flory (ASF) model, and is typically referred to as the ASF distribution. The ASF model depends on a chain growth probability variable, which is influenced by the nucleophilicity the FT catalyst, reductive chemical potential of the active site, the effectiveness of the catalyst for C-C coupling, and the reaction conditions in the FT reactor.

In a typical ASF distribution, lighter hydrocarbons (smaller than pentane) are produced with high selectivity if there is a low chain growth probability. At larger chain growth probabilities (approaching 1), heavier hydrocarbons with a carbon number greater than 21 are expected. Current industrial FT processes that produce a synthetic crude oil (syncrude) produce widely distributed hydrocarbon products with a carbon number between 1 and 80. This requires substantial downstream treatment, including but not limited to fractionation and hydrotreating, to produce a hydrocarbon mixture suitable for use as sustainable diesel or aviation fuel, in which saturated alkanes with a carbon number between 8 and 20 are preferred. As such, the overall yield of FT processes is decreased when specific fuel products, such as sustainable aviation fuel, are desired. For example, an industrial FT process that follows the ASF model has a maximum selectivity for products with a carbon number between 10 and 20 of approximately 39%. It is, therefore, desirable to develop gas-to-liquids processes with chemistry that enables deviations from the ASF model.

Another process that uses synthesis gas (syngas) to produce a commodity chemical is methanol production. Catalysts made of copper with zinc oxide on an alumina scaffold, known as copper-zinc-alumina or "CZA" catalysts, are typically used for the production of methanol from a synthesis gas comprised of carbon monoxide and hydrogen gases, methanol being a commodity chemical that is produced on the scale of millions of tons per year. Certain variants of CZA catalysts are also useful for the hydrogenation of $CO_2$ to methanol due to their high selectivity, but suffer from several other drawbacks such as product purity, methane coproduction, and limited catalyst lifetime. This high selectivity for methanol, however, hinders production of higher alcohols or hydrocarbons for situation where such higher alcohols or hydrocarbons may be desired.

In any of these processes, a crucial component is the catalyst that converts the carbonaceous feedstock and hydrogen gas (or hydrogen equivalents). Catalysts for $CO_2$ conversion, specifically, face a major challenge in that $CO_2$ requires a substantial amount of energy to transform into other compounds. This makes stability and activity a key challenge for industrial catalysts for $CO_2$ conversion. Some catalysts for thermochemical reduction of $CO_2$ have been demonstrated in academic literature, but none have transitioned to industrial use due to either high cost or poor stability. Ni-based catalysts are primarily used to hydrogenate $CO_2$ to $CH_4$, Co, Fe, Ru, Ir, Zn, Pd, Cu, and Rh compounds have also been used as $CO_2$ hydrogenation catalysts for higher hydrocarbon formation. Several combinations of these elements with specific ratios in bimetallic and trimetallic catalysts have also been attempted. However, no catalysts based on low-cost metals listed above (such as Cu, Zn, Fe, Co, or Ni) suitable for large-scale commercial deployment (e.g., not Pt-group metals such as Ru, Ir, and Rh) have yet been demonstrated as commercial catalysts for the hydrogenation of $CO_2$ to paraffins or other hydrocarbons suitable for use as diesel or aviation fuel.

This is, in part, because prior reported compounds have not shown the stability that is required for scaling up the materials, since these catalysts decay into less active materials while on-stream in a reactor. It is also due to their low selectivity for the appropriate hydrocarbons, based on the distribution of carbon chain lengths that are produced under commercial reactor conditions. Prior to the present disclosure, because of the lack of stable and efficient catalysts for this process, no commercial chemical process was known that converts carbon dioxide into hydrocarbon products suitable for use in diesel or aviation fuel without a separate step in a chemical process that converts $CO_2$ to CO or $CH_4$ (as in the Sabatier process) first.

The present disclosure provides catalysts made of copper and zinc oxide, optionally further comprising a metal selected from iron or cobalt for $CO_2$ conversion to long-chain hydrocarbons, and optionally including a support material such as alumina, a zeolite, or silica, as well as methods of using such catalysts for production of hydrocarbons from $CO_2$. As further described herein, the catalysts of the present disclosure include a first element (Co or Fe) as a metal promoting carbon-carbon bond formation. Previously, copper-zinc family catalysts such as copper and zinc oxide on alumina (CZA) catalysts had not been demonstrated as competent catalysts for $CO_2$ hydrogenation to multi-carbon products, such as paraffins. Among other benefits, the modified copper zinc catalysts of the present disclosure catalyze the production of hydrocarbons from carbonaceous feedstocks, $CO_2$, CO, or $CH_4$ at a higher rate than any other reported CZA or FT catalysts. These catalysts can also be used to inhibit the formation of gaseous byproducts during operation, e.g., $CH_4$, to further enable effective recycle of unreacted gases during product gas recycle in a multi-pass gas to liquids reactor.

In certain embodiments, the present disclosure provides catalysts comprising iron oxide, optionally further comprising one or more additional metals selected from copper and/or zinc. In certain such embodiments, the one or more additional metals aid in $CO_2$ activation and conversion (e.g., by acting as a metal promoter). In further embodiments, the catalysts comprising iron oxide further comprise a support including alumina, a zeolite, or silica. In certain embodiments, the catalysts comprising iron oxide are useful for converting $CO_2$ to long-chain hydrocarbons.

As further described herein, the catalysts of the present disclosure preferably include one of more additional metals (Cu and/or Zn) as a metal promoting $CO_2$ activation. Previously, iron family catalysts such as iron oxide catalysts have not been demonstrated as competent catalysts for $CO_2$ hydrogenation to multi-carbon products, such as paraffins.

In certain aspects, the present disclosure provides a chemical process to produce long-chain hydrocarbons from $CO_2$ and $H_2$ in a single reactor. The process is novel from prior CZA-based processes in that it produces multi-carbon species, and specifically long-chain alkanes with a carbon number between 6 and 20, where prior CZA-based processes produced only products with a carbon number between 1 and about 5. Furthermore, the process differs from FT-based processes in that $CO_2$ is a feedstock rather than CO. Increasing concentrations of $CO_2$ in the feedstock stream of typical cobalt-catalyzed FT processes causes the reactor to produce exclusively methane, as known to persons having ordinary skill in the art. The present invention, thus, represents a significant step forward in gas-to-liquids chemistry by using a catalyst and reaction conditions where little to no methane is produced with a feedstock stream comprised of $CO_2$ and $H_2$. In some embodiments, the present invention uses cobalt to promote C-C bonding and chain growth while simultaneously preventing the production of $CH_4$ through a combination of reactor conditions, adaptive monitoring of the reaction products, and catalyst composition.

In certain aspects, the present disclosure provides a chemical process to produce long-chain hydrocarbons from $CO_2$ and $H_2$ in a single reactor through an alcohol intermediate. In some embodiments, alcohols are co-produced with the long-chain hydrocarbons. In some embodiments, the alcohol co-produced with the long-chain hydrocarbons is primarily methanol. In some embodiments, the alcohols are an intermediate to the long-chain hydrocarbons in the chemical reaction occurring in the single reactor. In these cases, the production of the long-chain hydrocarbons is achieved by first producing an alcohol, then dehydrating the alcohol to produce either a bound $CH_x$ intermediate or a free olefin, such as ethylene or propylene. The bound $CH_x$ intermediate or free olefin are further oligomerized to produce the long-chain hydrocarbons. In some embodiments, the alcohols are a side-product to the long-chain hydrocarbons in the chemical reaction occurring in the single reactor.

In certain aspects, the present disclosure provides a chemical process to produce long-chain hydrocarbons from carbonaceous feedstocks that do not follow an ASF distribution. In some embodiments, the ASF distribution is deviated from because of mechanistic uniqueness from legacy FT processes. In some embodiments, the present invention provides for methods to produce a narrower distribution of desired hydrocarbons for diesel and aviation fuel than legacy FT processes. In some embodiments, the present invention provides for methods to selectively produce linear alkanes with a carbon number between 6 and 26. In some embodiments, the present invention provides for methods to selectively produce linear alkanes with a carbon number between 8 and 16. In some embodiments, the present invention provides for methods to selectively produce hydrocarbons with a carbon number between 6 and 30.

Figure 1:
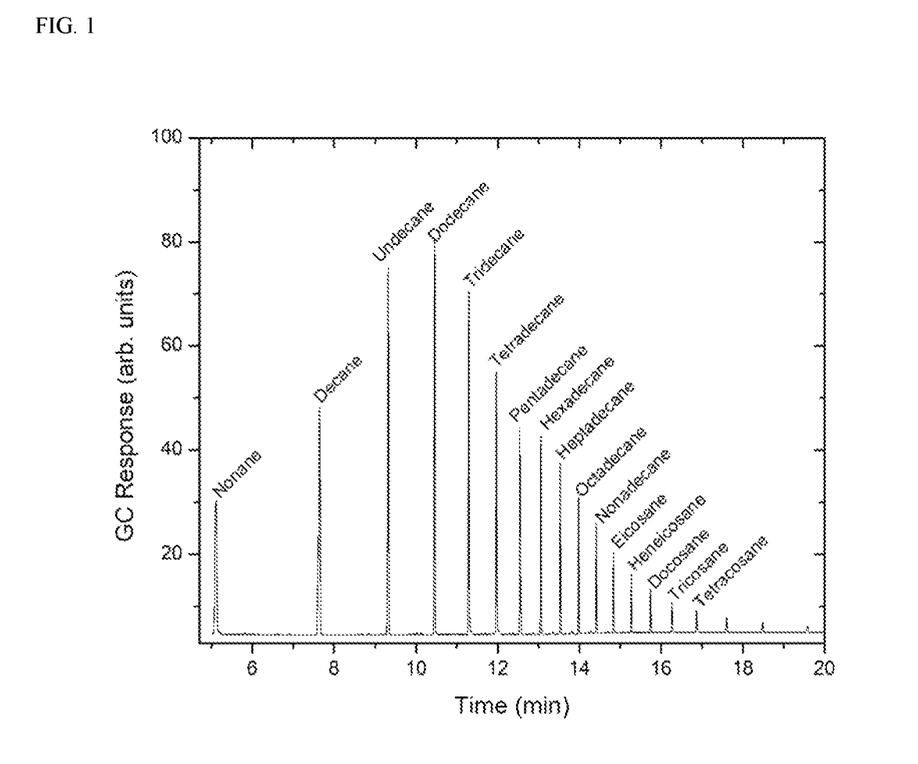
FIG. 1 shows a gas chromatogram identifying the primary individual hydrocarbon compounds in the hydrocarbon mixture produced by an exemplary cobalt copper zinc catalyst, namely straight-chain alkanes.
Figure 2:
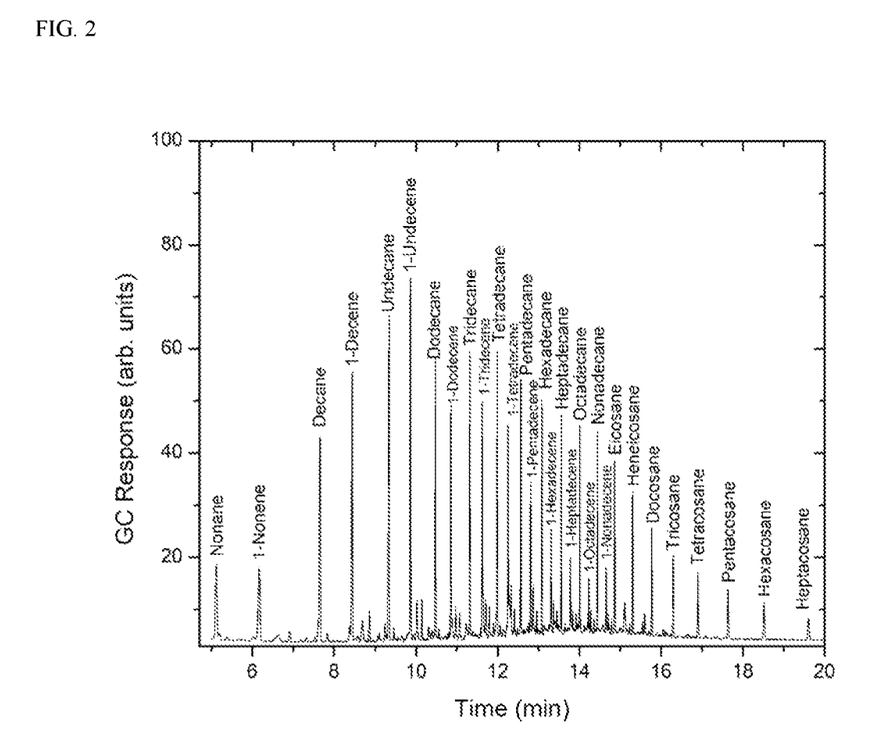
FIG. 2 shows a gas chromatogram identifying the primary individual hydrocarbon compounds in the hydrocarbon mixture produced by an exemplary iron copper zinc catalyst, including straight-chain alkanes and primary olefins.
Figure 3:
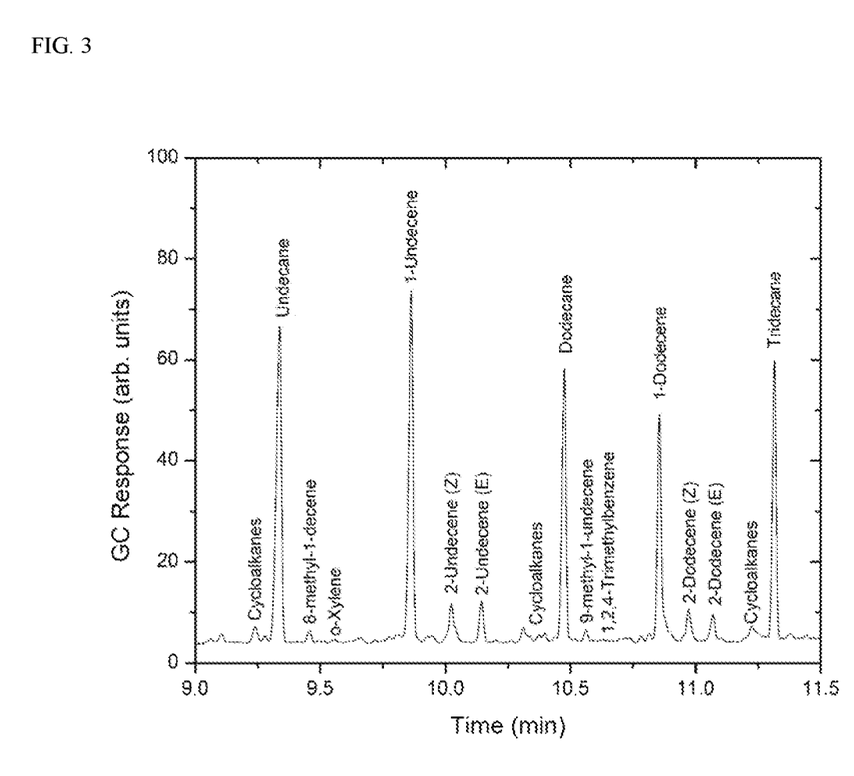
FIG. 3 shows a zoomed-in gas chromatogram identifying the individual hydrocarbon compounds in the hydrocarbon mixture produced by an exemplary iron copper zinc catalyst, including secondary olefins, aromatics, and cycloalkanes.

In certain aspects, the present disclosure provides catalysts to produce long-chain hydrocarbons from carbonaceous feedstocks with distinct differences between Co- and Fe-promoted catalysts. As shown in FIG. 1, Co-promoted copper zinc catalysts typically fully hydrogenate long-chain hydrocarbons to produce saturated straight-chain alkanes of various carbon numbers between 6 and 30. As shown in FIG. 2, Fe-promoted copper zinc catalysts typically partially hydrogenate long-chain hydrocarbons to produce a mixture of saturated alkanes, olefins, as well as smaller concentrations of branched and cycloalkanes, aromatics, alcohols, and carboxylic acids. In some embodiments, the present invention uses both Co and Fe in various ratios in a catalyst comprised of copper and zinc oxide to control the degree to which branching occurs or reaction intermediates are hydrogenated. In some embodiments, the ratio of Co:Fe is 100:1, 50:1, 20:1, 10:1, 5:1, 2:1, 1:1, 1:2, 1:5, 1:10, 1:20, 1:50, or 1:100.

In certain aspects, the present disclosure provides methods for adaptive monitoring of reactors to produce long-chain hydrocarbons from $CO_2$ and $H_2$ in a single reactor continuously, without the formation of byproducts. During operation of the reactor system to produce long-chain hydrocarbons from $CO_2$ and $H_2$, there is a narrow operating window of temperatures, pressures, and gas compositions that enables production of liquid products without any gaseous byproducts. The present invention provides for methods of real-time monitoring of the composition of the gaseous recycle loop in a gas-to-liquids reactor system and adaptive adjustment of feed gas ratios and temperatures. In some embodiments, real-time monitoring of the composition of the gaseous recycle loop is achieved by a syngas analyzer, which uses thermal conductivity detection to determine the relative concentration of $H_2$, and infrared detection to determine the relative concentrations of $CO_2$, CO, $CH_4$, and other hydrocarbons. In some embodiments, either software or operator intervention is used to adjust the feed ratio of $CO_2$ and $H_2$ based on the outlet composition of the detector to avoid formation of unrecyclable byproducts, such as $CH_4$.

Catalysts

In certain aspects, the present disclosure provides catalysts, comprising: copper; zinc; one or more first elements selected from iron or cobalt; oxygen; optionally, aluminum; optionally, one or more second elements selected from a Group V, VI, VII, VIII, IX, X, and XI metal (e.g., manganese, silver, niobium, zirconium, molybdenum, ruthenium, palladium, platinum, or nickel); and optionally, one or more Group IA metals, and wherein the one or more first elements is present in an amount of about 1 to about 40 wt. % (e.g., about 1 to about 10 wt. %, about 25 to about 40 wt. %, about 30 to about 40 wt. %, or about 35 to about 40 wt. %) of the total amount of the copper, zinc, one or more first elements, the optional second element, and the optional Group IA metal.

In some embodiments, the one or more first elements is present in an amount of about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, or about 40 wt. % of the total amount of the copper, zinc, the one or more first elements, the optional second element, and the optional Group IA metal. In some embodiments, the one or more first elements is present in an amount of 1-10 wt. %, 10-20 wt. %, or 20-30 wt. %, 20-25 wt. %, 22-24 wt. %, 25-40 wt. % 30-40 wt. %, or 35-40 wt. % of the total amount of the total amount of the copper, zinc, the one or more first elements, the optional second element, and the optional Group IA metal.

In some embodiments, the catalyst comprises a cobalt-embedded interconnected matrix of reduced copper metal nanoparticles and alumina-modified zinc oxide. In some embodiments, the cobalt is present as cobalt oxide. In some embodiments, the copper is present as copper oxide. In some embodiments, the molar ratio of cobalt to copper to zinc (Co:Cu:Zn) is about 0.1-3 in cobalt, 1-4 in copper, and 0.5-1.5 in zinc. In some embodiments, the Co:Cu:Zn ratio is in the range of 1-2 in cobalt, 1-3 in copper, and 0.5-1 in zinc. In some embodiments, the Co:Cu:Zn ratio is approximately 1:2.5:1. In some embodiments, the zinc is preferably 0.3-1 the molar content of the copper. In some embodiments, the cobalt is preferably 0.1-1 the molar content of the copper.

In some embodiments, the catalyst comprises an iron-embedded interconnected matrix of reduced copper metal nanoparticles and alumina-modified zinc oxide. In some embodiments, the iron is present as iron oxide. In some embodiments, the copper is present as copper oxide. In some embodiments, the molar ratio of iron to copper to zinc (Fe:Cu:Zn) is about 0.05-3 in iron, 1-4 in copper, and 0.5-4 in zinc. In some embodiments, the Fe:Cu:Zn ratio is in the range of 0.4-2 in iron, 1-3 in copper, and 0.5-3 in zinc. In some embodiments, the Fe:Cu:Zn ratio is approximately 1:2.3:2.3. In some embodiments, the zinc is preferably 0.3-1 the molar content of the copper. In some embodiments, the iron is preferably 0.5-5 the molar content of the copper.

In certain embodiments, catalysts of the disclosure comprise copper, e.g., reduced copper nanoparticles, and zinc oxide supported on an iron support. In further embodiments, the iron support is iron oxide. In yet further embodiments, the copper is present as copper oxide. In still further embodiments, the catalysts comprise iron, copper, and zinc in an Fe:Cu:Zn ratio that is from about 0.05 to about 3 in iron, about 1 to about 3 in copper, and about 0.5 to about 3 in zinc. In certain embodiments, the Fe:Cu:Zn ratio is from about 0.4 to about 3 in iron, about 0.4 to about 3 in copper, and about 0.4 to about 3 in zinc. In certain preferred embodiments, the Fe:Cu:Zn ratio is about 2.3:1:1. In certain preferred embodiments, the catalysts comprise a molar content of zinc that is from about 0.3 to about 1 times the molar content of copper. In certain preferred embodiments, the catalysts comprise a molar content of iron that is from about 0.5 to about 5 times the molar content of copper.

In some embodiments, the catalyst comprises one or more elements selected from a transition, or Group VI, VII, VIII, IX, X, or XI metal. In some embodiments, the catalyst comprises one or more second elements selected from a Group VI metal. In some embodiments, the catalyst comprises one or more second elements selected from a Group VII metal. In some embodiments, the catalyst comprises one or more second elements selected from a Group VIII metal. In some embodiments, the catalyst comprises one or more second elements selected from a Group IX metal. In some embodiments, the catalyst comprises one or more second elements selected from a Group X metal. In some embodiments, the catalyst comprises one or more second elements selected from a Group XI metal.

In some embodiments, the one or more second elements comprise manganese, silver, niobium, zirconium, molybdenum, ruthenium, palladium, platinum, or nickel.

In some embodiments, the one or more second elements comprise nickel. In some embodiments, the one or more second elements comprise silver. In some embodiments, the one or more second elements comprise palladium. In some embodiments, the one or more second elements comprise niobium. In some embodiments, the one or more second elements comprise manganese. In some embodiments, the one or more second elements comprise zirconium. In some embodiments, the one or more second elements comprise molybdenum.

In some embodiments, the catalyst comprises the one or more second elements at a molar ratio of about 0.15 to about 2 relative to copper. In some embodiments, the catalyst comprises the one or more second elements at a molar ratio of about 0.15 to about 1.5 relative to copper. In some embodiments, the catalyst comprises the one or more second elements at a molar ratio of about 0.15 to about 1 relative to copper. In some embodiments, the catalyst comprises the one or more second elements at a molar ratio of about 0.15 to about 0.75 relative to copper. In some embodiments, the catalyst comprises the one or more second elements at a molar ratio of about 0.15 to about 0.5 relative to copper. In some embodiments, the catalyst comprises the one or more second elements at a molar ratio of about 0.15 to about 0.25 relative to copper.

In some embodiments, the catalyst comprises copper at a molar ratio of about 0.5 to about 5 relative to the one or more first elements. In some embodiments, the catalyst comprises copper at a molar ratio of about 1 to about 10 relative to the one or more first elements. In some embodiments, the catalyst comprises copper at a molar ratio of about 2 to about 9 relative to the one or more first elements. In some embodiments, the catalyst comprises copper at a molar ratio of about 2.3 to about 8.4 relative to the one or more first elements. In some embodiments, the catalyst comprises copper at a molar ratio of about 2.3 relative to the one or more first elements. In some embodiments, the catalyst comprises copper at a molar ratio of about 8.4 relative to the one or more first elements. In some embodiments, the catalyst comprises copper at a molar ratio of about 1.5 relative to the one or more first elements. In some embodiments, the catalyst comprises copper at a molar ratio of about 1.0 relative to the one or more first elements. In some embodiments, the catalyst comprises copper at a molar ratio of about 0.75 relative to the one or more first elements. In some embodiments, the catalyst comprises copper at a molar ratio of about 0.5 relative to the one or more first elements.

In some embodiments, the catalyst comprises zinc at a molar ratio of about 0.3 to about 3 relative to copper. In some embodiments, the catalyst comprises zinc at a molar ratio of about 0.3 to about 3 relative to copper. In some embodiments, the catalyst comprises zinc at a molar ratio of about 0.4 to about 1 relative to copper. In some embodiments, the catalyst comprises zinc at a molar ratio of about 1.5 relative to copper. In some embodiments, the catalyst comprises zinc at a molar ratio of about 1.0 relative to copper. In some embodiments, the catalyst comprises zinc at a molar ratio of about 0.75 relative to copper. In some embodiments, the catalyst comprises zinc at a molar ratio of about 0.5 relative to copper. In some embodiments, the catalyst comprises zinc at a molar ratio of about 0.4 relative to copper.

In some embodiments, the one or more second elements comprise niobium. In some embodiments, the one or more second elements consist of niobium. In some embodiments, the niobium is present at a molar ratio of about 0.05 to about 1 relative to copper. In some embodiments, the niobium is present at a molar ratio of about 0.2 relative to copper. In some embodiments, the niobium is present at a molar ratio of about 0.3 relative to copper. In some embodiments, the niobium is present at a molar ratio of about 0.1 relative to copper.

In some embodiments, the catalyst comprises the one or more Group IA metals. In some embodiments, the catalyst comprises the one or more Group IA or IIA metals at a molar ratio from about 0.01 to about 1.0 relative to copper. In some embodiments, the catalyst comprises the one or more Group IA or IIA metals at a molar ratio from about 0.05 to about 0.50 relative to copper. In some embodiments, the catalyst comprises the one or more Group IA or IIA metals at a molar ratio from about 0.20 to about 0.50 relative to copper. In some embodiments, the catalyst comprises the one or more Group IA or IIA metals at a molar ratio from about 0.30 to about 0.50 relative to copper. In some embodiments, the catalyst comprises the one or more Group IA or IIA metals at a molar ratio from about 0.40 to about 0.50 relative to copper. In some embodiments, the catalyst comprises the one or more Group IA or IIA metals at a molar ratio at about 0.15 relative to copper.

In some embodiments, the catalyst comprises one or more Group IA metals. In some embodiments, the one or more Group IA or IIA metals comprise potassium, sodium or cesium. In some embodiments, the one or more Group IA or IIA metals consist of potassium, sodium or cesium. In some embodiments, the one or more Group IA or IIA metals comprise potassium. In some embodiments, the one or more Group IA or IIA metals comprise sodium. In some embodiments, the one or more Group IA or IIA metals comprise cesium. In some embodiments, the one or more Group IA or IIA metals consist of potassium. In some embodiments, the one or more Group IA or IIA metals consist of sodium. In some embodiments, the one or more Group IA or IIA metals consist of cesium.

In some embodiments, the catalyst comprises potassium at a molar ratio of about 0.05, about 0.09, about 0.1, about 0.15, about 0.2, about 0.25, about 0.3, about 0.35, about 0.4, about 0.45, or about 0.5 relative to copper. In some embodiments, the catalyst comprises potassium at a molar ratio of about 0.09 relative to copper.

In certain embodiments, the catalyst comprises iron at a molar ratio of about 0.1 to about 10 relative to copper. In further embodiments, the catalyst comprises iron at a molar ratio of about 0.1 to about 1 relative to copper. In yet further embodiments, the catalyst comprises iron at a molar ratio of about 0.1 to about 0.2 relative to copper. In certain embodiments, the catalyst comprises iron at a molar ratio of about 0.5 to about 1 relative to copper. In certain embodiments, the catalyst comprises iron at a molar ratio selected from about 0.1, about 0.2, about 2, about 3, about 4, about 5, about 6, about 7, about 8, about 9, and about 10 relative to copper.

In some embodiments, the catalyst comprises aluminum at a molar ratio of about 0.1 to about 10 relative to copper. In some embodiments, the catalyst comprises aluminum at a molar ratio of about 0.1 to about 1 relative to copper. In some embodiments, the catalyst comprises aluminum at a molar ratio of about 0.1 to about 0.2 relative to copper. In some embodiments, the catalyst comprises aluminum at a molar ratio of about 0.5 to about 1 relative to copper. In some embodiments, the catalyst comprises aluminum at a molar ratio of about 0.1 relative to copper. In some embodiments, the catalyst comprises aluminum at a molar ratio of about 0.2 relative to copper.

In some embodiments, the catalyst comprises zinc oxide.

In some embodiments, the catalyst comprises copper oxide.

In some embodiments, the catalyst comprises cobalt oxide.

In some embodiments, the catalyst comprises iron oxide.

In some embodiments, the catalyst comprises nickel oxide.

In some embodiments, the catalyst comprises alumina.

In certain embodiments, the one or more Group IA or IIA metals comprise or consist of sodium or cesium. In the catalysts of the present disclosure, substituting sodium or cesium for potassium does not substantially affect the catalytic activity, and both sodium and cesium have been found to provide the same stability potassium provides. This is a contrast with known syngas catalysts, where the choice of potassium, sodium or cesium greatly affects activity.

In some embodiments, the catalyst comprises or consists of aluminum oxide ($Al_2O_3$) wherein the aluminum is present in a molar ratio of about 0.02 to about 3 relative to copper. In some embodiments, the aluminum is present in a molar ratio of about 0.1 to about 0.8 relative to copper. In some embodiments, the aluminum is present in a molar ratio of about 0.7 relative to copper. In some embodiments, the alumina can be added as a support to increase the surface area of the copper and zinc, or produced in-situ as a component of the catalyst, e.g. from aluminum nitrate co-precipitation with first element, copper, and zinc precursors.

In certain embodiments, the catalyst comprises iron oxide (e.g., $Fe_3O_4$, $Fe_2O_3$, and/or FeO) and copper. In further embodiments, the iron is present in a molar ratio from about 0.2 to about 20 relative to copper. In yet further embodiments, the iron is present in a molar ratio of about 0.2 to about 10, about 0.2 to about 5, about 0.2 to about 2, about 0.2 to about 1, about 0.2 to about 0.5, about 1 to about 20, about 1 to about 10, or about 1 to about 2 relative to copper. In still further embodiments, the iron is present in a molar ratio selected from about 1, about 2, about 5, about 10, about 15, and about 20, relative to copper.

In some embodiments, the catalyst comprises iron oxide as a support that increases the surface area of the copper and zinc. In other embodiments, the iron oxide is produced in-situ as a component of the catalyst, for example by co-precipitating iron nitrate with copper and zinc precursors.

In some embodiments, the catalyst comprises copper, zinc oxide, cobalt, and alumina. In some such embodiments, the molar ratios of the components are as described above. In some embodiments, the catalyst comprises: cobalt; copper at a molar ratio of about 8.4 relative to the cobalt; zinc at a molar ratio of about 3.3 relative to the cobalt, and alumina, with the aluminum at a molar ratio of about 1.8 relative to cobalt. In some embodiments, the catalyst comprises: copper at a molar ratio of about 8.4 relative to the cobalt; zinc oxide at a molar ratio of about 3.3 relative to the cobalt; and alumina at a molar ratio of about 0.9 relative to the cobalt.

In some embodiments, the catalyst comprises copper, zinc oxide, nickel, and alumina. In some such embodiments, the molar ratios of the components are as described above. In some embodiments, the catalyst comprises: nickel; copper at a molar ratio of about 2.5 relative to the nickel; zinc at a molar ratio of about 1 relative to the cobalt, and alumina, with the aluminum at a molar ratio of about 0.7 relative to nickel. In some embodiments, the catalyst comprises: copper at a molar ratio of about 2.5 relative to the nickel; zinc oxide at a molar ratio of about 1 relative to the nickel; and alumina at a molar ratio of about 0.35 relative to the nickel.

In some embodiments, the catalyst comprises copper, zinc oxide, iron, and alumina. In some such embodiments, the molar ratios of the components are as described above. In some embodiments, the catalyst comprises: iron; copper at a molar ratio of about 2.3 relative to the iron; zinc at a molar ratio of about 2.3 relative to the iron, and alumina, with the aluminum at a molar ratio of about 0.8 relative to iron. In some embodiments, the catalyst comprises: copper at a molar ratio of about 2.3 relative to the iron; zinc oxide at a molar ratio of about 2.3 relative to the iron; and alumina at a molar ratio of about 0.4 relative to the iron.

In some embodiments, the catalyst comprises copper, zinc oxide, cobalt, alumina, and a Group IA metal. In some embodiments, the molar ratios of the components are as described above. In some embodiments, the catalyst comprises: cobalt; copper at a molar ratio of about 8.4 relative to the cobalt; zinc at a molar ratio of about 3.3 relative to the cobalt; alumina, with the aluminum at a molar ratio of about 1.8 relative to the cobalt; and the one or more Group IA or IIA metals at a molar ratio of about 0.14 relative to the cobalt. In some embodiments, the catalyst comprises: copper at a molar ratio of about 8.4 relative to the cobalt; zinc oxide at a molar ratio of about 3.3 relative to the cobalt; alumina at a molar ratio of about 0.9 relative to the cobalt; and the one or more Group IA or IIA metals at a molar ratio of about 0.14 relative to the cobalt.

In some embodiments, the catalyst comprises copper, zinc oxide, nickel, alumina, and a Group IA metal. In some embodiments, the molar ratios of the components are as described above. In some embodiments, the catalyst comprises: nickel; copper at a molar ratio of about 2.5 relative to the nickel; zinc at a molar ratio of about 1 relative to the nickel; alumina, with the aluminum at a molar ratio of about 0.7 relative to the nickel; and the Group IA at a molar ratio of about 0.1 relative to the nickel. In some embodiments, the catalyst comprises: copper at a molar ratio of about 2.5 relative to the nickel; zinc oxide at a molar ratio of about 1 relative to the nickel; alumina at a molar ratio of about 0.35 relative to the nickel; and the one or more Group IA or IIA metals at a molar ratio of about 0.1 relative to the nickel.

In some embodiments, the catalyst comprises copper, zinc oxide, iron, alumina, and a Group IA metal. In some embodiments, the molar ratios of the components are as described above. In some embodiments, the catalyst comprises: iron; copper at a molar ratio of about 2.3 relative to the iron; zinc at a molar ratio of about 2.3 relative to the iron; alumina, with the aluminum at a molar ratio of about 0.4 relative to the iron; and the one or more Group IA or IIA metals at a molar ratio of about 0.4 relative to the iron. In some embodiments, the catalyst comprises: copper at a molar ratio of about 2.5 relative to the iron; zinc oxide at a molar ratio of about 1 relative to the iron; alumina at a molar ratio of about 0.35 relative to the iron; and the one or more Group IA or IIA metals at a molar ratio of about 0.1 relative to the iron.

In some embodiments, the catalyst comprises Cu, Zn, Al, O, and an alkali metal. In certain embodiments, the catalyst comprises Cu, Zn, Fe, and O. In some embodiments, the catalyst comprises Cu, Zn, Ni, Al, O, and an alkali metal. In some embodiments, the catalyst comprises Cu, Zn, Fe, Al, O, and an alkali metal. In some embodiments, the catalyst comprises Cu, Zn, Co, Fe, Al, O, and an alkali metal. In some embodiments, the catalyst comprises Cu, Zn, Co, Al, O, and an alkali metal. In some embodiments, the catalyst comprises Cu, Zn, Co, Nb, Al, and O, and an alkali metal. In some embodiments, the catalyst comprises Cu, Zn, Co, Ni, Al, and O, and an alkali metal. In some embodiments, the catalyst comprises Cu, Zn, Co, Mo, Al, and O, and an alkali metal.

In some embodiments, the catalyst comprises Cu, Zn, Al, and O. In some embodiments, the catalyst comprises Cu, Zn, Fe, Al, and O. In some embodiments, the catalyst comprises Cu, Zn, Ni, Al, and O. In some embodiments, the catalyst comprises Cu, Zn, Co, Al, and O. In some embodiments, the catalyst comprises Cu, Zn, Co, Fe, Al, and O. In some embodiments, the catalyst comprises Cu, Zn, Co, Nb, Al, and O. In some embodiments, the catalyst comprises Cu, Zn, Co, Ni, Al, and O. In some embodiments, the catalyst comprises Cu, Zn, Co, Mo, Al, and O.

In certain embodiments, the elemental composition of the catalyst material is $Cu(ZnO)CoA/Al_2O_3$, $Cu(ZnO)CoFeA/Al_2O_3$, $Cu(ZnO)CoNbA/Al_2O_3$, $Cu(ZnO)CoNiA/Al_2O_3$, $Cu(ZnO)CoMoA/Al_2O_3$, or $Cu(ZnO)A/Fe_3O_4$, wherein A is an alkali metal and further wherein the relative amounts of the elemental components are as described above.

In certain embodiments, the elemental composition of the catalyst material is $Cu(ZnO)Co/Al_2O_3$, $Cu(ZnO)CoFe/Al_2O_3$, $Cu(ZnO)CoNb/Al_2O_3$, $Cu(ZnO)CoNi/Al_2O_3$, $Cu(ZnO)CoMo/Al_2O_3$, $Cu(ZnO)Nb/Fe_3O_4$, wherein the relative amounts of the elemental components are as described above.

In some embodiments, the catalyst is selected from one of the following exemplary catalysts: CuO(ZnO), Cu(ZnO)Co, Cu(ZnO)CoK, Cu(ZnO)CoFe, Cu(ZnO)Fe, Cu(ZnO)CoFeK, Cu(ZnO)FeK, Cu(ZnO)CoNi, Cu(ZnO)CoNiK, Cu(ZnO)CoNb, Cu(ZnO)CoNbK, Cu(ZnO)CoMo, Cu(ZnO)CoMoK on $Al_2O_3$, wherein the relative amounts of the elemental components are as described above. In certain such embodiments, the catalyst is approximately $CuO_{(2)}(ZnO)_{(1)}$, $Cu_{(2.5)}(ZnO)_{(1)}Co_{(1)}$, $Cu_{(2.5)}(ZnO)_{(1)}Co_{(1)}K_{(0.1)}$, $Cu_{(1)}(ZnO)_{(1)}Co_{(1)}Fe_{(1)}$, $Cu_{(1)}(ZnO)_{(1)}Fe_{(1)}$, $Cu_{(1)}(ZnO)_{(1)}Co_{(1)}Fe_{(1)}K_{(0.15)}$, $Cu_{(1)}(ZnO)_{(1)}Fe_{(1)}K_{(0.15)}$, $Cu_{(2)}(ZnO)_{(1)}Co_{(1)}Ni_{(1)}$, $Cu_{(2)}(ZnO)_{(1)}Co_{(1)}Ni_{(1)}K_{(0.15)}$, $Cu_{(2)}(ZnO)_{(1)}Co_{(1)}Nb_{(1)}$, $Cu_{(2)}(ZnO)_{(1)}Co_{(1)}Nb_{(1)}K_{(0.15)}$, $Cu_{(2)}(ZnO)_{(1)}Co_{(1)}Mo_{(1)}$, $Cu_{(2)}(ZnO)_{(1)}Co_{(1)}Mo_{(1)}K_{(0.15)}$.

In further aspects, provided herein are catalysts for the production of paraffins comprising:
  one or more metals;
  optionally one or more second elements selected from copper and zinc;
  optionally one or more Group VI, VII, VIII, IX, X, or XI metal additives;
  optionally a Group IA or IIA metal promoter.

In certain embodiments, the one or more metals is selected from elected from cobalt, iron, nickel, indium, yttrium, a lanthanide, and combinations thereof. In further embodiments, the one or more metals is cobalt. In yet further embodiments, the one or more metals is iron. In still further embodiments, the one or more metals is a combination of iron and cobalt.

In certain embodiments, the one or more metals is present in the form of an oxide, nitride, or carbide. In further embodiments, the one or more second elements is copper. In yet further embodiments, the one or more second elements is zinc. In still further embodiments, the one or more second elements are copper and zinc. In certain embodiments, the one or more second elements is present in the form of an oxide, nitride, or carbide.

In certain embodiments, the one or more Group VI, VII, VIII, IX, X, or XI metal additives, when present, is selected from manganese, silver, niobium, zirconium, molybdenum, ruthenium, palladium, platinum, or nickel. In further embodiments, the Group IA or IIA metal promoter, when present, is a Group IA element. In yet further embodiments, the Group IA or IIA metal promoter, when present, is lithium, sodium, potassium, or cesium. In still further embodiments, the one or more second elements is present in an amount of about 0.5 to about 40 wt. % of the total amount of the one or more metals, the second element, the optional one or more Group VI, VII, VIII, IX, X, or XI metal additives, and the optional Group IA or IIA metal promoter.

In certain aspects, the systems and methods of the present disclosure involve the use of hydrogenation catalysts and isomerization catalysts for isomerizing or hydrogenating percentages of the hydrocarbons produced, respectively. In certain embodiments, the hydrogenation catalysts and isomerization catalysts of the disclosure may be independently selected from the catalysts described below.

In certain embodiments, the isomerization catalysts and/or the hydrogenation catalysts of the present disclosure are aluminosilicate catalysts, such as zeolites. In further embodiments, the isomerization catalyst and/or the hydrogenation catalyst is $AlCl_3$. In yet further embodiments, the isomerization catalyst and/or the hydrogenation catalyst is doped with a transition metal, such as Pt, Pd, etc. In still further embodiments, the isomerization catalyst and/or the hydrogenation catalyst is Pt on beta-zeolite. In certain embodiments, isomerization catalysts and/or hydrogenation catalysts of the disclosure comprise an isomerization catalyst metal, and a zeolite support. In further embodiments, the isomerization catalyst metal is selected from Pd, Pt, Ni—Co, Ni—W, and Ni—Mo. In yet further embodiments, the zeolite support is selected from $SiAlO_x$, $SO_4$—$ZrO_2$, Y-type zeolites, beta-zeolite, ZSM5, ZSM22, SAPO11, SAPO31, SAPO41, and $TiO_2$. In still further embodiments, the isomerization catalyst and the hydrogenation catalyst are independently selected from Pt/$SiAlO_x$, Pt/$SO_4$—$ZrO_2$, Pt/ZSM5, Pt/ZSM22, Pt/SAPO, Ni—W/$SiAlO_x$, Ni—W/$SO_4$—$ZrO_2$, Ni—W/ZSM5, Ni—W/ZSM22, and Ni—W/SAPO.

In certain embodiments, the isomerization metal comprises from about 0.5 wt % to about 40 wt % of the isomerization catalyst and/or the hydrogenation catalyst. In further embodiments, the isomerization metal comprises about 0.5 wt % of the isomerization catalyst and/or the hydrogenation catalyst. In yet further embodiments, the isomerization metal comprises about 1 wt % of the isomerization catalyst and/or the hydrogenation catalyst. In still further embodiments, the isomerization metal comprises about 10 wt % of the isomerization catalyst and/or the hydrogenation catalyst. In certain embodiments, the isomerization metal comprises about 20 wt % of the isomerization catalyst and/or the hydrogenation catalyst. In further embodiments, the isomerization metal comprises about 30 wt % of the isomerization catalyst and/or the hydrogenation catalyst. In yet further embodiments, the isomerization metal comprises about 40 wt % of the isomerization catalyst and/or the hydrogenation catalyst.

In certain embodiments, when the isomerization catalyst is Pt/$Al_2O_3$, the isomerization temperature is about 250° C. and the isomerization pressure is about 750 psi. In certain embodiments, when the isomerization catalyst is a zeolite-based catalyst, the isomerization temperature is about 300° C. and the isomerization pressure is about 750 psi.

Catalytic Compositions

In certain aspects, the present disclosure provides catalytic compositions, comprising one or more of the catalysts disclosed herein and an additional support. The additional support may be any suitable material that can serve as a catalyst support.

In some embodiments, the additional support comprises one or more materials selected from an oxide, nitride, fluoride, silicate, or carbide of an element selected from aluminum, silicon, titanium, zirconium, cerium, magnesium, yttrium, lanthanum, zinc, and tin. In further embodiments, the additional support comprises one or more materials selected from an oxide, nitride, fluoride, silicate, or carbide of an element selected from aluminum, silicon, titanium, zirconium, cerium, magnesium, yttrium, lanthanum, zinc, iron, and tin. In some preferred embodiments, the additional support comprises γ-alumina. In certain embodiments, the additional support is selected from carbon, silica, zeolite, alumina, zirconium oxide, titanium oxide, and silica carbide. In certain embodiments, the additional support is selected from carbon, silica, zeolite, alumina, iron oxide, zirconium oxide, titanium oxide, and silica carbide. In some embodiments, the additional support is an aluminum oxide that is formed in-situ as part of the catalyst. In some embodiments, the additional support is selected from, but not limited to, $Al_2O_3$, $ZrO_2$, $SnO_2$, $SiO_2$, ZnO, and $TiO_2$. In some embodiments, the additional support is selected from $Al_2O_3$, $ZrO_2$, $SnO_2$, $SiO_2$, ZnO, and $TiO_2$. In some embodiments, the additional support is selected from $Al_2O_3$, $ZrO_2$, $SnO_2$, $SiO_2$, ZnO, $Fe_2O_3$, $Fe_3O_4$, FeO, and $TiO_2$.

In some embodiments, the additional support comprises one or more carbon-based materials. In some embodiments, the carbon-based material is selected from activated carbon, carbon nanotubes, graphene and graphene oxide.

In some embodiments, the additional support is a mesoporous material. In some embodiments, the additional support has a mesopore volume from about 0.01 to about 3.0 cc/g.

In some embodiments, the additional support has surface area from about 10 $m^2$/g to about 1000 $m^2$/g. In some preferred embodiments, the catalytic composition comprising the additional support and a catalyst disclosed herein has a surface area from about 10 $m^2$/g to about 1000 $m^2$/g.

In some embodiments, the catalytic composition is in a form of particles having an average size from about 10 nm to about 5 μm. In some embodiments, the catalytic composition is in a form of particles having an average size from about 20 nm to about 5 μm. In some embodiments, the catalytic composition is in a form of particles having an average size from about 50 nm to about 1 μm. In some embodiments, the catalytic composition is in a form of particles having an average size from about 100 nm to about 500 nm. In some embodiments, the catalytic composition is in a form of particles having an average size from about 50 nm to about 300 nm.

In some embodiments, the catalytic composition comprises from about 5 wt. % to about 80 wt. % of the catalyst. In some embodiments, the catalytic composition comprises from about 5 wt. % to about 70 wt. % of the catalyst. In some embodiments, the catalytic composition comprises from about 20 wt. % to about 70 wt. % of the catalyst. In some embodiments, the catalytic composition comprises from about 30 wt. % to about 70 wt. % of the catalyst.

In some embodiments, the support is a high surface area scaffold. In some embodiments, the support comprises mesoporous silica. In some embodiments, the support comprises carbon allotropes.

In some embodiments, the catalyst is a nanoparticle catalyst. In some embodiments, the particle sizes of the catalyst on the surface of the scaffold are about 1 nm to 5 nm.

In some embodiments, the particle sizes of the catalyst on the surface of the scaffold are about 5 nm to 100 nm. In some embodiments, the particle sizes of the catalyst on the surface of the scaffold are 100-500 nm. In some embodiments, the particles not subjected to agglomeration are 100-500 nm in particle size.

Methods of Preparation

The catalysts and catalytic compositions of the present disclosure may be prepared by any suitable method. In certain aspects, the present disclosure provides methods for preparing the catalysts or the catalytic compositions disclosed herein, comprising preparing the catalyst by coprecipitation, wet impregnation, or ball milling.

In some embodiments, the method comprises the following steps:
  (a) providing a first solution comprising a source of cobalt, copper, zinc, aluminum, a base, and water;
  (b) heating the first solution at a first temperature for a first period of time, thereby producing the first reaction mixture;
  (c) heating the first reaction mixture at a second temperature for a second period of time to remove the water, thereby producing a solid precursor; and
  (d) heating the solid precursor to a third temperature for a third period of time, thereby isolating the catalyst.

In some embodiments, the method comprises the following steps:
  (a) providing a second solution comprising a source of cobalt, copper, zinc, iron, and water;
  (b) providing a third solution comprising a base;
  (c) heating the third solution at a third temperature for a third period of time;
  (d) adding alumina to the third solution, thereby producing a second reaction mixture;
  (e) adding the second solution to the second reaction mixture at a fourth temperature for a fourth period of time, thereby producing a third reaction mixture;
  (f) heating the third reaction mixture at a fifth temperature for a fifth period of time, thereby producing a solid precursor;
  (g) isolating the solid precursor;
  (h) contacting the solid precursor with a solution comprising a Group IA metal, thereby producing a catalyst precursor; and
  (i) heating the catalyst precursor to a sixth temperature for a sixth period of time, thereby isolating the catalyst.

In some embodiments, the method comprises the following steps: providing a first solution comprising a source of cobalt, a source of copper, a source of zinc, and a source of aluminum. Combining the first solution with a basic precipitant, such as a carbonate, to increase the pH of the metal salt containing solution thereby precipitating solid particles. The solid particles are dried and calcined to form a solid catalyst.

In certain embodiments, the base comprises carbonate and a cation selected from potassium, sodium, ammonium, lithium, and cesium. In other embodiments, the base comprises bicarbonate and a cation selected from potassium, sodium, ammonium, lithium, and cesium.

In some embodiments, the method comprises the following steps: providing a first solution comprising a cobalt source and introducing it to a pre-made copper-zinc alumina material via incipient wetness or wet impregnation, followed by drying and calcining to form a solid catalyst.

In some embodiments, the method comprises the following steps: mixing a cobalt source and a support in a mill jar to provide a first mixture; ball milling the first mixture for between 2 hours to 2 weeks to thereby provide a first precipitate; filtering the first precipitate and heating to a first temperature to provide a ball milled cobalt source; mixing the ball milled cobalt source with a source of copper and zinc and a source of the alumina to provide a second mixture; and isolating a solid material from the second mixture.

In some embodiments, the method further comprises combining the solid material with a source of the one or more Group IA metals. In some embodiments, the method further comprises pressing the solid material into pellets. In some embodiments, the method further comprises pressing the solid material into pellets prior to introduction into a flow reactor.

Methods of Hydrogenation

In certain aspects, the present disclosure provides methods of reducing carbonaceous feedstock, namely $CO_2$ to a liquid product mixture, comprising contacting the catalysts of catalytic compositions disclosed herein with a feed mixture comprising $CO_2$ and a reductant gas at a reduction temperature and a reduction pressure, thereby providing the liquid product mixture.

In some embodiments, the reductant gas is $H_2$. In some embodiments, the reductant gas is a hydrocarbon, such as $CH_4$, ethane, propane, or butane. In preferred embodiments, the hydrocarbon is $CH_4$. In certain such embodiments, the $CH_4$ is a component of a gas mixture that also comprises other hydrocarbons, such as ethane, propane, or butane. For example, the gas mixture used to supply $CH_4$ may be (or may be derived from) flare gas, waste gas, natural gas, or the like.

In some embodiments, the feed mixture further comprises CO. In some embodiments, the feed mixture comprises less than 25% of CO, less than 20% of CO, less than 15% of CO, less than 10% of CO, less than 5% of CO, or less than 1% of CO. In some embodiments, the feed mixture is substantially free of CO.

In some embodiments, the reduction temperature is from about 100 to about 600° C. In some embodiments, the reduction temperature is from about 275 to about 350° C. In some embodiments, the reduction temperature is about 275° C. In some embodiments, the reduction temperature is about 300° C.

In some embodiments, the reduction pressure is from about 50 to about 3000 psi. In some embodiments, the reduction pressure is from about 900 to about 1100 psi. In some embodiments, the reduction pressure is about 1000 psi.

In some embodiments, the partial pressure of $CO_2$ in the feed mixture is from about 20 to about 1500 psi. In some embodiments, the partial pressure of $CO_2$ in the feed mixture is from about 200 to about 800 psi, from about 200 to about 600 psi, from about 200 to about 400 psi, or from about 300 to about 400 psi. For example, the partial pressure of $CO_2$ in the feed mixture is about 200 psi, about 250 psi, about 300 psi, about 350 psi, about 400 psi, about 450 psi, about 500 psi, about 550 psi, about 600 psi, about 650 psi, about 700 psi, about 750 psi, about 800 psi, about 850 psi, about 900 psi, about 950 psi, or about 1000 psi. In some embodiments, the partial pressure of $CO_2$ in the feed mixture is about 330 psi.

In some embodiments, the ratio of reductant gas:$CO_2$ in the feed mixture is about 10:1 to about 1:10. In some embodiments, the ratio of reductant gas:$CO_2$ in the feed mixture is about 5:1 to about 0.5:1. In some embodiments, the ratio of reductant gas:$CO_2$ in the feed mixture is about 4:1 to about 1:1. In some embodiments, the ratio of reductant gas:$CO_2$ in the feed mixture is about 3:1.

In some embodiments, the liquid product mixture comprises methanol. In some embodiments, the liquid product mixture comprises methanol, ethanol, and n-propanol. In some embodiments, the liquid product mixture comprises methanol, ethanol, acetic acid, and n-propanol. In some embodiments, the amount of ethanol and higher alcohols is at least 10 wt. % of the total In some embodiments, the amount of ethanol and higher alcohols is at least 7 wt. % of the total amount of liquid product mixture. In some embodiments, the amount of ethanol and higher alcohols is at least 5 wt. % of the total amount of liquid product mixture. In some embodiments, the amount of ethanol and higher alcohols is at least 2 wt. % of the total amount of liquid product mixture. In some embodiments, the molar ratio of ethanol and higher alcohols to the total amount of methanol and n-propanol in the liquid product mixture is from about 1:5 to about 1:10. In some embodiments, the amount of formic acid in the liquid product mixture is less than 10 ppm. In some embodiments, the amount of isopropanol in the liquid product mixture is less than 10 ppm.

In some embodiments, the liquid product mixture comprises hydrocarbons. In some embodiments, the liquid product mixture comprises paraffins. As used herein, the term "paraffins" refers to hydrocarbons which are preferably linear, but may include branched hydrocarbons. Exemplary paraffins have carbon numbers from 6-20, preferably from 9-16.

For the methods described herein, the term "liquid product mixture" refers to products which are liquid at atmospheric pressure and temperature.

In some embodiments, the liquid product mixture comprises paraffins, olefins, and other hydrocarbons. In some embodiments, the amount of paraffins is at least 50 wt. % of the total non-aqueous products. In some embodiments, the amount of paraffins is at least 10 wt. % of the total amount of liquid product mixture. In some embodiments, the amount of paraffins is at least 5 wt. % of the total amount of liquid product mixture. In some embodiments, the amount of paraffins is at least 2 wt. % of the total amount of liquid product mixture. In some embodiments, the molar ratio of paraffins to the total amount of carbon-containing products in the liquid product mixture is from about 1:2 to about 1:10. In some embodiments, the amount of formic acid in the liquid product mixture is less than 1,000 ppm. In some embodiments, the amount of isopropanol in the liquid product mixture is less than 1,000 ppm.

It is an object of the present invention to use low GHSVs (gas hourly space velocity) to provide high gas product recyclability and avoid certain byproducts such as formaldehyde or methane. In some embodiments, the method does not produce C1 alkanes or aldehydes such as formaldehyde or methane. In some embodiments, the method produces less than about 0.5 wt % formaldehyde or methane. In some embodiments, the method produces less than about 0.05 wt % formaldehyde or methane. In some embodiments, the method produces less than about 50 ppm formaldehyde or methane. In some embodiments, the method produces less than 5 ppm formaldehyde or methane.

In some embodiments, the GHSV of reactant gases and recycle gases introduced to the reactor is 10. In some embodiments, the GHSV of reactant gases and recycle gases introduced to the reactor is 100. In some embodiments, the GHSV of reactant gases and recycle gases introduced to the reactor is 500. In some embodiments, the GHSV of reactant gases and recycle gases introduced to the reactor is 1,000. In some embodiments, the GHSV of reactant gases and recycle gases introduced to the reactor is 2,000. In some embodiments, the GHSV of reactant gases and recycle gases introduced to the reactor is 5,000. In some embodiments, the GHSV of reactant gases and recycle gases introduced to the reactor is 10,000. In some embodiments, the GHSV of reactant gases and recycle gases introduced to the reactor is 20,000 or higher.

In some embodiments, the GHSV of reactant gases and recycle gases introduced to the reactor is from about 10 to about 20,000. In some embodiments, the GHSV of reactant gases and recycle gases introduced to the reactor is from about 10 to about 10,000. In some embodiments, the GHSV of reactant gases and recycle gases introduced to the reactor is from about 10 to about 5,000. In some embodiments, the GHSV of reactant gases and recycle gases introduced to the reactor is from about 10 to about 2,000. In some embodiments, the GHSV of reactant gases and recycle gases introduced to the reactor is from about 10 to about 1,000. In some embodiments, the GHSV of reactant gases and recycle gases introduced to the reactor is from about 10 to about 500. In some embodiments, the GHSV of reactant gases and recycle gases introduced to the reactor is from about 10 to about 100.

In some embodiments, the GHSV of reactant gases and recycle gases introduced to the reactor is less than about 10. In some embodiments, the GHSV of reactant gases and recycle gases introduced to the reactor is less than about 100. In some embodiments, the GHSV of reactant gases and recycle gases introduced to the reactor is less than about 500. In some embodiments, the GHSV of reactant gases and recycle gases introduced to the reactor is less than about 1,000. In some embodiments, the GHSV of reactant gases and recycle gases introduced to the reactor is less than about 2,000. In some embodiments, the GHSV of reactant gases and recycle gases introduced to the reactor is less than about 5,000. In some embodiments, the GHSV of reactant gases and recycle gases introduced to the reactor is less than about 10,000. In some embodiments, the GHSV of reactant gases and recycle gases introduced to the reactor is less than about 20,000.

In some embodiments, the GHSV of reactant gases and recycle gases introduced to the reactor is 100. In some embodiments, the GHSV of reactant gases and recycle gases introduced to the reactor is 500. In some embodiments, the GHSV of reactant gases and recycle gases introduced to the reactor is 1,000. In some embodiments, the GHSV of reactant gases and recycle gases introduced to the reactor is 2,000. In some embodiments, the GHSV of reactant gases and recycle gases introduced to the reactor is 5,000. In some embodiments, the GHSV of reactant gases and recycle gases introduced to the reactor is 10,000. In some embodiments, the GHSV of reactant gases and recycle gases introduced to the reactor is 20,000.

In some embodiments, the method comprises contacting the catalyst with the feed mixture for at least 8,000 hours. In some embodiments, the method comprises contacting the catalyst with the feed mixture for at least 96 hours. In some embodiments, the method comprises contacting the catalyst with the feed mixture for at least 24 hours.

In certain embodiments, methods of the disclosure further comprise contacting the liquid product mixture and a first reduction gas with an isomerization catalyst at an isomerization temperature and an isomerization pressure to afford an isomerized product mixture comprising linear paraffins, branched paraffins, and/or naphthenes.

In further embodiments, the isomerized product mixture comprises:
additional $C_{1-8}$ hydrocarbons;
additional $C_{9-15}$ hydrocarbons including linear paraffins, branched paraffins, and naphthenes; and
additional $C_{16+}$ hydrocarbons.

In some embodiments, the numbers used to describe and claim certain embodiments of the disclosure are modified in some instances by the term "about." In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In certain embodiments, the term "about" means within 10%, 9%, 8%, 7%, 6%, 5%, 4%, 3%, 2, 1%, 0.5%, or 0.05% of a given value or range.

EXAMPLES

The invention now being generally described, it will be more readily understood by reference to the following examples which are included merely for purposes of illustration of certain aspects and embodiments of the present invention, and are not intended to limit the invention.

Example 1: Elemental Composition of Exemplary Cobalt Copper Zinc Alumina Catalyst

| Metal oxide | CuO | ZnO | CoO | $Al_2O_3$ | MgO |
|---|---|---|---|---|---|
| wt % | 59.0% | 23.2% | 7.1% | 9.3% | 1.4% |
| Metal content | Cu | Zn | Co | Al | Mg |
| wt % | 47.1% | 18.7% | 5.6% | 4.9% | 0.8% |

Example 2: Synthesis of Exemplary Cobalt Copper Zinc Alumina Catalyst by Combined Coprecipitation and Wet Impregnation A first solution comprising zinc nitrate (1 molar equivalent), copper nitrate (3 molar equivalents), aluminum nitrate (1.4 molar equivalents), and a second solution comprising sodium carbonate (9.7 molar equivalents) are combined in a reactor. The resulting mixture is stirred rapidly and heated at 70-90° C. for 2 hours, then filtered. The resulting solid material is dried under air at 110° C. for 12 hours, and the resulting solid material is crushed, heated to 350° C. in air at a heating rate of 2° C./min, and calcined at 350° C. for 6 h. After calcining, the resulting power is then further ground with a mortar and pestle. The powder is pelletized and a liquid comprised of $Co(NO_3)_2 \cdot 6H_2O$ dissolved in water (8 wt % Co in the aqueous solution) is added to the pelletized catalyst by incipient wetness impregnation and heated, to result in the cobalt copper zinc alumina catalyst (CCZA).

Example 3: Synthesis of Exemplary Iron Catalyst by Co-Precipitation and Wet Impregnation A first solution of ferric nitrate (1 molar equivalent), and a base solution comprising sodium carbonate (1.2 molar equivalents) are combined in a reactor at about 60° C. The resulting mixture is stirred rapidly and heated at 70° C. to 90° C. for 2 hours, then filtered and dried. The resulting solid material is dried under air at 110° C. for 12 hours, and the resulting solid material is crushed, heated to 350° C. in air at a heating rate of 2° C./min, and calcined at 350° C. for 6 h. After calcining, the resulting powder is further ground with a mortar and pestle.

Example 4: Elemental Composition of Exemplary Iron Copper Zinc Catalyst with and without Alumina Iron Copper Zinc Catalyst without Alumina (FCZK)

| Metal oxide | CuO | ZnO | $Fe_2O_3$ | $K_2CO_3$ |
|---|---|---|---|---|
| wt % | 37.7% | 38.5% | 18.9% | 4.9% |
| Metal content | Cu | Zn | Fe | K |
| wt % | 30.1% | 31.0% | 13.2% | 2.8% |

Iron Copper Zinc Alumina Catalyst

| Metal oxide | CuO | ZnO | $Fe_2O_3$ | $Al_2O_3$ |
|---|---|---|---|---|
| wt % | 35.7% | 36.5% | 17.9% | 10.0% |
| Metal content | Cu | Zn | Fe | Al |
| wt % | 28.5% | 29.3% | 12.5% | 5.3% |

Example 5: $CO_2$ Reduction in the Presence of an Exemplary Cobalt Copper Zinc Catalyst $CO_2$ reduction in the presence of CCZA was performed over a course of 14 days under the following conditions:
3:1 $H_2$:$CO_2$ ratio;
GHSV was approximately 2000 $h^{-1}$;
$CO_2$ conversion per pass about 30%;
Temperature 270° C.;
Pressure 1000 psi.
Composition of the liquid product fraction resulting from the reaction is shown in Table 1.

TABLE 1

Chemical species and approximate relative abundance of product in a gas chromatography analysis of CCZA catalyst product.

| Product | Percentage of Total GC Peak Area (%) |
|---|---|
| Nonane | 12.60 |
| Decane | 15.20 |
| Undecane | 15.11 |
| Dodecane | 13.60 |
| Tridecane | 11.93 |
| Tetradecane | 9.86 |
| Pentadecane | 7.85 |
| Hexadecane | 6.11 |
| Heptadecane | 4.72 |
| Octadecane | 3.67 |
| Nonadecane | 2.88 |
| Eicosane | 2.23 |
| Heneicosane | 1.76 |
| Docosane | 1.39 |
| Tricosane | 1.11 |

TABLE 1-continued

Chemical species and approximate relative abundance of product in a gas chromatography analysis of CCZA catalyst product.

| Product | Percentage of Total GC Peak Area (%) |
|---|---|
| Tetracosane | 0.89 |
| Pentacosane | 0.69 |
| Hexacosane | 0.56 |
| Heptacosane | 0.45 |

Example 6: Catalytic Reduction of $CO_2$ to Hydrocarbons Using an Iron Copper Zinc Catalyst $CO_2$ reduction in the presence of FCZK was performed over a course of 14 days under the following conditions:
3:1 $H_2$:$CO_2$ ratio;
GHSV was approximately 5000 $h^{-1}$;
$CO_2$ conversion per pass about 20%;
Temperature 270° C.;
Pressure 1000 psi.
Composition of the liquid product fraction resulting from the reaction is shown in Table 2.

TABLE 2

Chemical species and approximate relative abundance of product in a gas chromatography analysis of FCZK catalyst product.

| Product | Percentage of Total GC Peak Area (%) |
|---|---|
| Nonane | 5.69 |
| Nonene | 6.09 |
| Decane | 11.03 |
| Decene | 10.75 |
| Undecane | 12.99 |
| Undecene | 11.52 |
| Dodecane | 8.62 |
| Dodecene | 7.56 |
| Tridecane | 8.24 |
| Tridecene | 8.31 |
| Tetradecane | 8.97 |
| Tetradecene | 7.11 |
| Pentadecane | 6.65 |
| Pentadecene | 5.64 |
| Hexadecane | 5.81 |
| Hexadecene | 2.68 |
| Heptadecane | 5.27 |
| Heptadecene | 1.99 |
| Octadecane | 5.03 |
| Octadecene | 1.37 |
| Nonadecane | 4.85 |
| Nonadecene | 1.80 |
| Eicosane | 4.34 |
| Heneicosane | 3.86 |
| Docosane | 3.23 |
| Tricosane | 2.72 |
| Tetracosane | 2.62 |
| Pentacosane | 2.33 |
| Hexacosane | 1.99 |
| Heptacosane | 1.46 |

Example 7: General Procedure for Hydro-Isomerization of Paraffins

Paraffins are fed into an isomerization reactor loaded with a hydro-isomerization catalyst (Pt on beta-zeolite, 0.5 wt % Pt). The reaction is carried out at 750 psi and 250° C., with a mole ratio of hydrogen over hydrocarbons set at 500, and a liquid weight hourly space velocity of 1.0 $h^{-1}$ The paraffins are converted into a mixture of saturated n-paraffins and iso-paraffins with a selective range of carbon chain number between $C_8$ and $C_{15}$.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method for converting $CO_2$ and a first reduction gas to long-chain hydrocarbons comprising:
    contacting a feed mixture comprising $CO_2$ and the first reduction gas with a first catalyst to produce a product mixture comprising long-chain hydrocarbons, wherein the first catalyst comprises
    iron and
    zinc; and
    wherein the product mixture comprises a gaseous product mixture and a liquid product mixture comprising linear hydrocarbons with a carbon number between 6 and 30.

2. The method of claim 1, wherein the first catalyst further comprises carbon, silica, zeolite, alumina, zirconium oxide, titanium oxide, or silica carbide.

3. The method of claim 1, wherein the first catalyst does not comprise a zeolite.

4. The method of claim 1, wherein the first catalyst further comprises a Group IA or IIA element promoter, and wherein the iron is present in an amount selected from about 10 to about 40 wt. % of the total amount of the iron, zinc, and the Group IA or IIA element promoter.

5. The method of claim 1, wherein the product mixture comprises less than about 0.5 wt % formaldehyde or methane.

6. The method of claim 1, wherein the liquid product mixture consists essentially of linear hydrocarbons with a carbon number between 6 and 26.

7. The method of claim 1, wherein the liquid product mixture comprises at least 5 wt. % paraffins.

8. The method of claim 1, wherein the liquid product mixture comprises at least 50 wt. % paraffins.

9. The method of claim 1, wherein a ratio of an amount of paraffins to a total amount of carbon-containing products in the liquid product mixture is from about 1:2 to about 1:10 by weight.

10. The method of claim 1, wherein the method further comprises:
    monitoring the product mixture;
    capturing unreacted components and partially reacted components from the feed mixture to produce a recycled gas mixture;
    combining the recycled gas mixture with the feed mixture in a dynamic ratio; and adapting the dynamic ratio of the recycled gas mixture to the feed mixture.

11. The method of claim 1, further comprising contacting the product mixture and a second reduction gas with an isomerization catalyst at an isomerization temperature and an isomerization pressure to afford an isomerized product mixture comprising linear paraffins, branched paraffins, naphthenes, or a combination thereof.

12. The method of claim 1, wherein the liquid product mixture comprises hydrocarbons with a carbon number between 9 and 15.

13. The method of claim 3, wherein the liquid product mixture comprises hydrocarbons with a carbon number between 9 and 15.

14. The method of claim 4, wherein the liquid product mixture comprises hydrocarbons with a carbon number between 9 and 15.

15. The method of claim 3, wherein the liquid product mixture comprises at least 50 wt. % paraffins.

16. The method of claim 15, wherein the liquid product mixture comprises hydrocarbons with a carbon number between 9 and 15.

17. The method of claim 1, wherein the liquid product mixture comprises a first fraction consisting of hydrocarbons with a carbon number between 9 and 15.

18. The method of claim 1, wherein the liquid product mixture consists of hydrocarbons with a carbon number between 9 and 15.

19. The method of claim 4, wherein the Group IA or IIA element promoter is potassium.

20. The method of claim 1, wherein the iron, the zinc, or both the iron and the zinc are present in the form of an oxide, nitride, or carbide.

* * * * *